US007711624B2

(12) United States Patent
Abbott et al.

(10) Patent No.: US 7,711,624 B2
(45) Date of Patent: May 4, 2010

(54) SYSTEM AND METHOD FOR DETERMINING AND ADMINISTERING AN ANNUITY WITH GUARANTEED MINIMUM ACCUMULATION BENEFIT

(75) Inventors: Lynn Murphy Abbott, Minneapolis, MN (US); Douglas K. Dunning, Applie Valley, MN (US); Joseph Patrick Heckel, Shoreview, MN (US); D. Keith Pinkley, River Falls, MN (US); Alan Hays Treece, Plymouth, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 400 days.

(21) Appl. No.: 11/163,842

(22) Filed: Nov. 1, 2005

(65) Prior Publication Data

US 2006/0111997 A1  May 25, 2006

Related U.S. Application Data

(60) Provisional application No. 60/629,670, filed on Nov. 19, 2004.

(51) Int. Cl.
*G06Q 40/00* (2006.01)
(52) U.S. Cl. ................ 705/36 R; 705/35; 705/36 T
(58) Field of Classification Search ................ None
See application file for complete search history.

(56) References Cited

U.S. PATENT DOCUMENTS

| 5,933,815 | A | 8/1999 | Golden |
| 6,064,986 | A * | 5/2000 | Edelman ................. 705/36 R |
| 7,089,201 | B1 | 8/2006 | Dellinger et al. |
| 2002/0077866 | A1* | 6/2002 | Javerlhac ................. 705/4 |
| 2003/0120570 | A1* | 6/2003 | Dellinger et al. ............ 705/35 |
| 2004/0177022 | A1* | 9/2004 | Williams et al. ............ 705/36 |
| 2006/0041455 | A1* | 2/2006 | Dehais ..................... 705/4 |
| 2006/0085338 | A1* | 4/2006 | Stiff et al. ................ 705/40 |
| 2006/0095353 | A1* | 5/2006 | Midlam .................. 705/35 |
| 2006/0111998 | A1* | 5/2006 | Fisher et al. ............. 705/35 |

OTHER PUBLICATIONS

Happier Returns: Guaranteed death benefit options within variable annuities can help cautious investors tiptoe into equities and aggressive investors protect their estates, Donald Jay Korn, Financial Planning, Jul. 1, 2001, pp. 1-4.*

Unique in the Market, The Lincoln SmartSecurity Advantage, A Variable Annuity Option, Now Also Offers an Automatic Annual Reset, Business Wire. New York: Oct. 18, 2004. pp. 1-3.*

(Continued)

*Primary Examiner*—Alexander Kalinowski
*Assistant Examiner*—Gregory Johnson
(74) *Attorney, Agent, or Firm*—Snell & Wilmer L.L.P.

(57) ABSTRACT

A computer-implemented method of calculating a value of a benefit for an annuity contract including a minimum contract accumulation value provision is disclosed. The method includes determining a current minimum contract accumulation value, determining a current value of the annuity contract investments, determining a predetermined reset percentage contained in the annuity contract, calculating the product of the current value of the annuity contract investments and the reset percentage and a fifth step of resetting the minimum contract accumulation value to the greater of the minimum contract accumulation value or the product of the current value of the annuity contract investments and the reset percentage.

20 Claims, 2 Drawing Sheets

OTHER PUBLICATIONS

Happier Returns: Guaranteed death benefit options within variable annuities can help cautious investors tiptoe into equities and aggressive investors protect their estates, Donald Jay Korn, Financial Planning, Jul. 1, 2001, pp. 1-4.*

How do the new GMIBs stack up?, Nancy M Kenneally and Douglas L Robbins, National Underwriter, Oct. 11, 1999, vol. 103, Issue 41, pp. 10 and 18.*

New Products: Life Insurance, Bank Investment Marketing, Oct. 1, 1996, p. 1.*

Money-Back Guarantee, Ron Panko, Best's Review, May 2004, vol. 105, Issue 1, pp. 77-78 and 80-82.*

Penn Mut. Beefs Up Diversifier II VA (variable annuity), Linda Koco, National Underwriter (Life, health/financial services ed.), Dec. 3, 1990, vol. 94, Issue 49; pp. 1-2.*

Putnam-Allstate Annuity Modified to Add Boomer Appeal; Reich-Hale, David; American Banker, v 165, n 217, Nov. 13, 2000; pp. 1-2.*

Happier Returns: Guaranteed death benefit options within variable annuities can help cautious investors tiptoe into equities and aggressive investors protect their estates, Donald Jay Korn, Financial Planning, Jul. 1, 2001, pp. 1-4.*

Unique in the Market, The Lincoln SmartSecurity Advantage, A Variable Annuity Option, Now Also Offers an Automatic Annual Reset, Business Wire, New York: Oct. 18, 2004. 3-pages.*

New Products: Life Insurance, Bank Investment Marketing, Oct. 1, 1996, 2-pages.*

Money-Back Guarantee, Ron Panko, Best's Review, May 2004, vol. 105, Issue 1, pp. 77-78 and 80-82.*

* cited by examiner

SYSTEM AND METHOD FOR DETERMINING AND ADMINISTERING AN ANNUITY WITH GUARANTEED MINIMUM ACCUMULATION BENEFIT

CROSS-REFERENCE TO RELATED APPLICATIONS

This application claims priority to, and the benefit of, U.S. Provisional Application Ser. No. 60/629,670 filed Nov. 19, 2004 and entitled "Annuity with Guaranteed Minimum Accumulation Benefit", which is hereby incorporated by reference.

FIELD OF INVENTION

The present invention relates to determining and administering a benefit for an annuity contract. More specifically, the system and method determines and administers a benefit for an annuity contract, including a periodic automatic reset of a minimum contract accumulation value.

BACKGROUND OF INVENTION

Annuities have become a more attractive option for retirement savings. Once considered noncompetitive and inflexible, annuities have become more popular as annuity providers have introduced products with a variety of flexible tax-deferred savings options. An annuity is a tax-deferred savings vehicle packaged as an insurance product. In most cases when an annuity is bought, its earnings are tax-deferred until the beginning of withdrawal of the interest or other income earned. Often an annuity includes a mandatory waiting period between the purchase of the annuity contract and the first withdrawal period. Because the owner is not paying taxes on gains made during the waiting period, the owner has the chance to earn gains on untaxed money, which may grow more quickly than a taxable account does. Indeed, earnings have the potential to compound more quickly and when the owner reaches retirement age, their tax bracket in retirement is often lower than it is in the income-earning years.

Annuities were classified as either fixed or variable. A fixed annuity provided a set minimum guaranteed rate of return backed by an insurance company, much as a bank provides a stated rate of return on a certificate of deposit. Although the rate of return varied somewhat depending on the prevailing interest rates, the minimum rate of return provided more stability than a variable annuity. Funds in a variable annuity were to be invested in stocks, bonds, or money market funds, depending upon the type of subaccount chosen. Usually, the subaccount was selected based on the level of risk and return wanted in the annuity, just as when purchasing a mutual fund. The amount of return depended on the actual return of the subaccount investment and there was not minimum guaranteed rate of return associated with a variable annuity.

SUMMARY OF INVENTION

The invention includes a system and method for determining and administering a benefit for an annuity contract including a periodic automatic reset of a minimum contract accumulation value. The guarantee minimum contract accumulation value of the annuity is automatically periodically reset (i.e. monthly, quarterly, yearly, etc.) to a specified percentage of the annuity contract value without extending the mandatory waiting period or increasing the contract price. The periodic automatic reset can optionally be combined with a periodic elective option to reset the guaranteed minimum contract accumulation value of the annuity. An advantage is to provide an annuity combining the investment flexibility of a variable annuity with the stability of a guaranteed rate of return.

The invention includes a computer-implemented method of calculating a value of a benefit for an annuity contract, the annuity contract including a minimum contract accumulation value provision, the method comprising the steps of: determining a current minimum contract accumulation value; determining a current value of annuity contract investments; determining a predetermined reset percentage contained in the annuity contract; calculating a product of the current value of the annuity contract investments and the predetermined reset percentage; and resetting the minimum contract accumulation value to the greater of (i) the minimum contract accumulation value, and (ii) the product of the current value of the annuity contract investments and the predetermined reset percentage.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for administering benefits for an annuity contract. The invention facilitates the calculation of a minimum contract accumulation value (MCAV) for an annuity contract with a minimum contract accumulation value.

Figure 1:
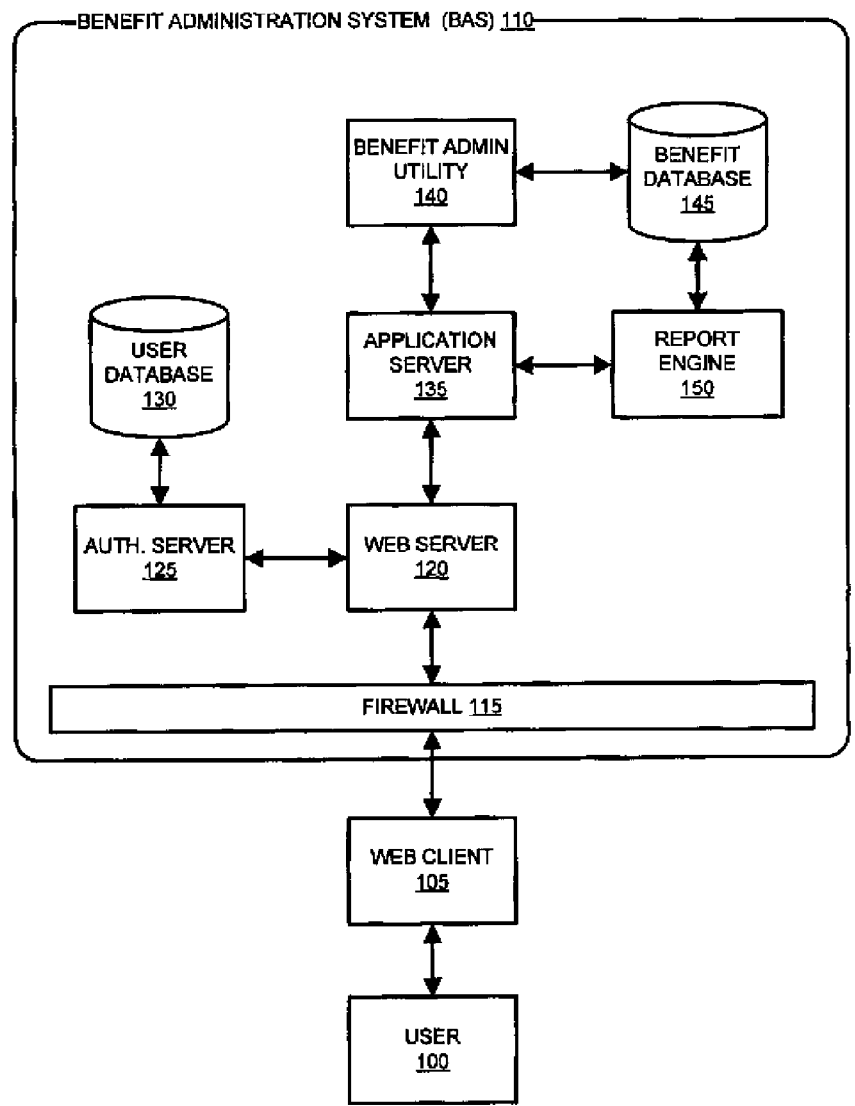
FIG. 1 is a block diagram illustrating the major system components for an exemplary system for determining and administering a benefit for an annuity contract including a periodic automatic reset of a minimum contract accumulation value.

With reference to FIG. 1, in one embodiment, the system facilitates interaction between user 100 and benefit administration system (BAS) 110 through a web client 105. Web client 105 is connected to a web server 120 through a network connection (e.g., Internet, Intranet, LAN, WAN and the like). Web server 105 may employ an authentication server 125 in order to validate and assign proper permissions to authorized users of the system. Permission database 130 stores user credentials and permissions specific to each user. Web server 120 also employs an application server 135 to manage various applications utilized by system 110. Application server 135 may be a stand-alone server or may comprise software residing within web server 120.

In one embodiment, benefit admin utility 140 is invoked by application server 135 to calculate a MCAV. While shown in FIG. 1 as connecting to product approval utility 140 through a web server, those skilled in the art will appreciate that supplier host 155 may connect with various components of BAS 110 either directly, or indirectly through another component. When calculating MCAV, benefit admin utility 140 retrieves and stores data relating to an annuity within benefit database 145. In one embodiment, benefit admin utility 140 interfaces with a report engine 150 to generate views of items stored in benefit database 145. In one embodiment, report engine 150 further provides pre-configured and/or ad-hoc reports relating to one or more annuity contracts.

In addition to the components discussed above, BAS 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; asset data; enterprise data, merchant data; financial institution data; and/or like data useful in the operation of the invention.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interacts with BAS 110 to determine and administer benefits for annuity contracts. User 100 may be, for example, an investment broker. The investment broker may interact with BAS 110, on behalf of her client, in order to determine which administer a benefit for an annuity with a guaranteed minimum contract accumulation value. User 100 may interface with BAS 110 via any communications protocol, device or method discussed herein or known in the art. In one embodiment, user 100 may interact with the invention via an Internet browser at a web client 105.

Web client 105 may comprise any hardware and/or software suitably configured to facilitate input, receipt and/or review of any information related to BAS 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the BAS 110. For example, web client 105 may access the services of the BAS 110 through another server, which may have a direct or indirect connection to web server 120.

As those skilled in the art will appreciate, web client 105 may include an operating system (e.g., WINDOWS NT, 95/98/2000, OS2, UNIX, LINUX, SOLARIS, MACOS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more BAS 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form. Web server 120 may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, ORACLE, SYBASE, INFORMIX MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect BAS 110 components from users of other networks. Firewall 115 may reside in varying configurations including Stateful Inspection, Proxy based and Packet Filtering among others. Firewall 115 may be integrated as software within web server 120, any other system components or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and BAS 110 and web client 105. Web server 120 may interface with applications server 135 through any means discussed herein or known in the art including a LAN/WAN, for example. Application server 135 may further invoke benefit admin utility 140 and/or report engine 150 in response to a user 100 request.

In one embodiment, report engine 150 includes any hardware and/or software suitably configured to produce reports from information stored in one or more databases. Report engines are commercially available and known in the art. Report engine 150 may provide printed reports, web access to reports, graphs, real-time information, raw data, batch information and/or the like. Report engine 150 may be implemented through commercially available hardware and/or software, through custom hardware and/or software components, or through a combination thereof. Further, report engine 150 may reside as a standalone system within BAS 110 or as a component of applications server 135 or web server 120.

In one embodiment, benefit admin utility 140 includes any hardware and/or software suitably configured to carry out the steps described below in reference to FIG. 2. Benefit admin utility 140 may exist as a standalone computing device or as a software entity stored within applications server 135 or web server 120. Benefit admin utility 140 may communicate directly or indirectly with one or more computing devices such as mainframe computers, for example. Further, Product approval utility 140 may include business rules such as, for example, to define how to adjust the MCAV in response to payments and credits applied to an annuity during a predefined period of time.

In order to control access to web server 120 or any other component of the invention, web server 120 may invoke an authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 pre-defined privileges attached to the credentials. Authentication server 125 may grant varying degrees of application and data level access to user 100 based on user information stored within member user 130.

In one embodiment, user database 130 includes any hardware and/or software suitably configured to facilitate storing authentication and/or privilege information relating to users 100. Benefit database 145 stores data relating to contract information for any number of annuities along with any other related information as disclosed herein. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Figure 2:
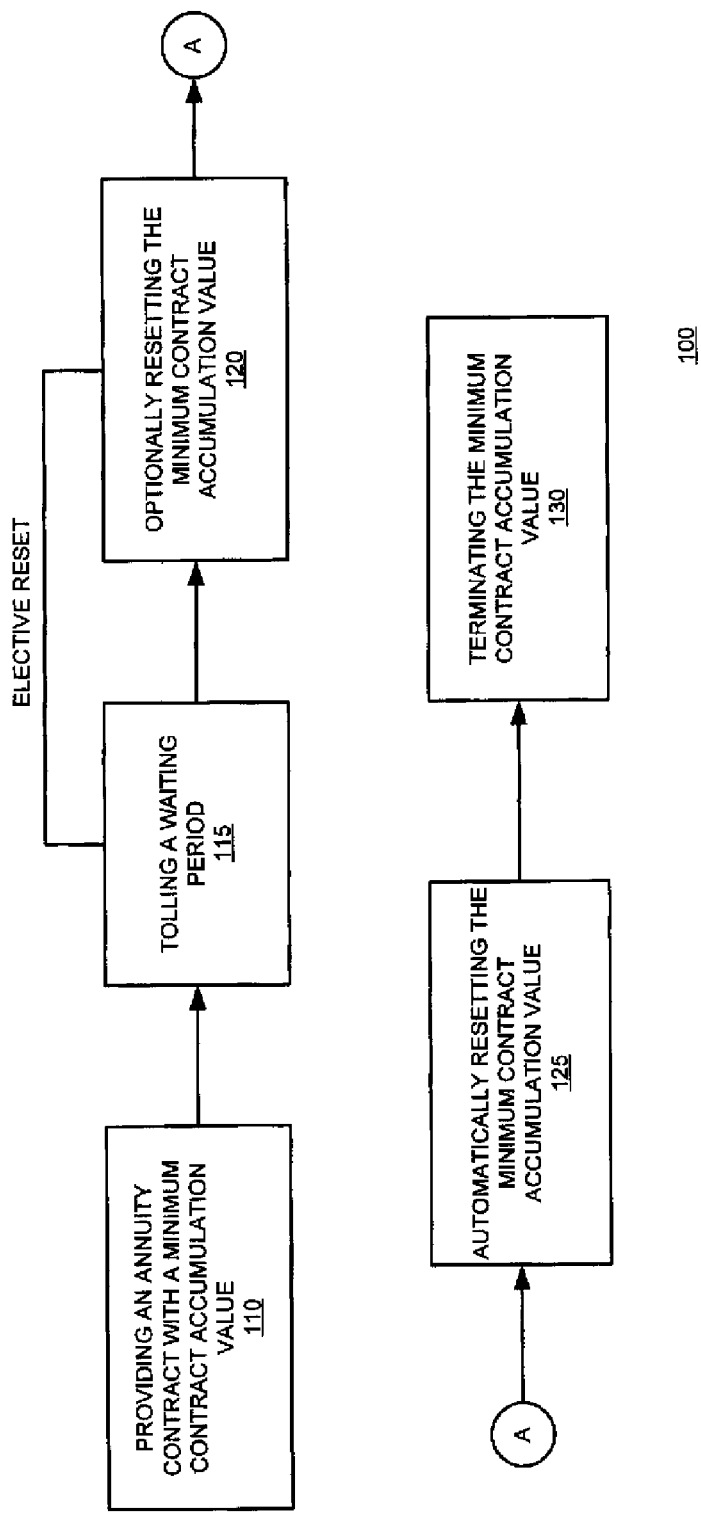
FIG. 2 is a flow chart illustrating an exemplary system and method for determining and administering a benefit for an annuity contract including a periodic automatic reset of a minimum contract accumulation value.

Referring now to FIG. 2, the process flows depicted are merely embodiments of the invention and are not intended to limit the scope of the invention as described herein. For example, the steps recited in any of the method or process descriptions may be executed in any order and are not limited to the order presented. It will be appreciated that the following description makes appropriate references not only to the steps depicted in FIG. 2, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like. In one embodiment, the computing unit of web client 105 may retain in storage one or more programs configured to provide data processing capabilities and a graphical user interface for the presentation of data.

FIG. 2 illustrates a system and method for determining and administering a benefit for an annuity contract containing a periodic automatic reset of a minimum contract accumulation value. As shown in FIG. 2, the system and method 100 includes a first step of providing an annuity contract with a minimum contract accumulation value 110, a second step of tolling a waiting period 115, a third step of periodically automatically resetting the minimum contract accumulation value 125 and a fourth step of terminating the minimum contract accumulation value benefit 130. As further shown in FIG. 2, when the annuity contract further includes a periodic elective reset of the minimum contract accumulation value, the system and method 100 includes an optional fifth step of periodically optional resetting the minimum contract accumulation value 120.

As shown in FIG. 2, the step of providing an annuity contract with a minimum contract accumulation value 110 includes establishing a minimum contract accumulation value (MCAV). The MCAV is the benefit guarantee for the annuity contract. The MCAV may become effective on the contract date, on the contract anniversary or on any other date specified by the annuity contract. The MCAV may be determined at the time the MCAV becomes effective. For example, if the MCAV is effective on the date of the contract, the MCAV may equal the payments and credits applied to the contact before the contract date. Alternatively, the MCAV may be determined by guaranteeing a specified percentage of payments and credits to the annuity contract within a period of time following the issue of an annuity contract. For example, the MCAV may be equal to 100% of the payments and credits applied to the annuity contract within the first six months following the establishment of the annuity contract. Alternatively, if the MCAV is effective starting on the contract anniversary, the MCAV may be determined to be the contract value of the annuity contract on the anniversary date. Alternatively, the MCAV may be equal to any percentage of payments and credits applied to the account over any period of time. The MCAV may be adjusted any time during the implementation of the system and method 100 to account for partial withdrawals made on or after the effective date of the benefit. The MCAV may be further subject to automatic and/or elective periodic resetting as described further below.

As shown in FIG. 2, the system and method 100 includes the step of tolling a waiting period 115. The waiting period may be a waiting period between the step of providing an annuity contract with a MCAV 110 and the step of periodically automatically resetting the MCAV 125. For example, the annuity contract may specify an annual waiting period. In another example, the annuity contract may require a waiting period of ten years. Alternatively, the waiting period may be any length of time.

The system and method 100 also includes the step of periodically automatically resetting the MCAV 125, as shown in FIG. 2. The step of periodically automatically resetting the MCAV 125 includes automatically resetting the MCAV at the end of each waiting period. The step of periodically automatically resetting the MCAV 125 may include resetting the MCAV to the greater of (1) the previously determined MCAV or (2) the product of the actual contract value of the annuity investments and the automatic reset percentage designated in the annuity contract. No action is required on the part of the contract holder at that time of the automatic resetting of the MCAV to receive the benefit, aside from having the contract in force. In some cases, the MCAV benefit expires after the benefit date. Otherwise, the system and method 100 returns to the step of tolling a waiting period 115.

For example, the automatic reset percentage designated in the annuity contract may be 80% and the period for automatically resetting the MCAV may be annual. In this example, at each anniversary of the contract annuity, the MCAV may be reset to the greater of the previously determined MCAV or 80% of the current actual value of the annuity investments.

Thus, if the previous MCAV is $100,000 and the value of the annuity investments at the anniversary is $120,000, the MCAV is automatically reset to $100,000, i.e., the greater of the previous MCAV ($100,000) and 80% of $120,000 ($96,000). In one embodiment of the system and method 100, the step of periodically automatically resetting the MCAV 125 does not restart the waiting period and does not increase the fees charged for the MCAV benefit.

In another example, the reset percentage designated in the annuity contract may be 100% of the value of the annuity investments at each anniversary, not to exceed 110% of the previous MCAV. In this example, if the previous MCAV is $100,000 and the value of the annuity investments at the anniversary is $120,000, the MCAV is automatically reset to $110,000 i.e., the greater of the previous MCAV ($100,000) and 100% of $120,000, not to exceed 110% of $100,000 ($110,000).

In another example, the period for resetting the MCAV may be a one time period of ten years, after which the MCAV benefit terminates as described further below with respect to the step of terminating the MCAV benefit 130. If the benefit date has not yet occurred, the waiting period may restart and the system and method 100 returns to the step of tolling a waiting period 115.

The system and method 100 further includes the step of terminating the MCAV benefit 130, as shown in FIG. 2. It is contemplated that the step of terminating the MCAV benefit 130 may occur, for example, at any of the following, according to the terms of the annuity contract: the contract holder may terminate the MCAV benefit within thirty days after the first contract anniversary; the contract holder may terminate the MCAV benefit after the effective date of the benefit; the benefit may terminate on the date the contract holder makes a full withdrawal from the annuity contract; the benefit may terminate on the date annuitization begins; the MCAV benefit may terminate as a result of the death benefit being paid or the MCAV benefit may terminate on the MCAV benefit date; etc.

In instances in which the step of terminating the MCAV benefit 130 occurs on the benefit date or another time payment is due under the contract, the step of terminating the MCAV benefit 130 may include paying a benefit to the contract holder. For example, if the MCAV is greater than the current actual value of the investments, or contract value, the benefit paid to the contract holder is equal to the MCAV less the contract value (i.e., excess of MCAV over the contract value). Alternatively, if the MCAV is less than the current actual value of the investments, or contract value, no benefit is paid. It is contemplated that payment may become due under the contract at the end of a specified time period, such as, for example, 100 years, or may become due at the occurrence of a specified event, such as, for example, the death of the insured party.

As further shown in FIG. 2, the system and method 100 may include the step of periodically optional resetting the MCAV. The step of periodically optional resetting the MCAV may be provided in addition to the step of periodically automatically resetting the MCAV 125. According to the step of periodically optional resetting the MCAV shown in FIG. 2, within a specified period following the effective date of the MCAV benefit and/or each automatic reset of the MCAV, the contract holder may notify the issuer of the annuity that he/she wishes to exercise the elective reset option. Similar to the step of periodically automatic resetting of the MCAV 125, the step of periodically optional resetting the MCAV may include resetting the MCAV to the greater of (1) the previously determined MCAV or (2) the product of the actual contract value of the annuity investments and the elective reset percentage designated in the annuity contract. For example, the elective reset percentage designated in the annuity contract may be 100%. In one embodiment of the system and method 100, the step of periodically optional resetting the MCAV restarts the waiting period and increases the fees charged for the MCAV benefit.

Fees associated with the MCAV benefit may be provided in the annuity contract. For example, an annual fee may be charged based on the annuity contract value on each annuity contract anniversary. The fee may be calculated by multiplying a benefit charge specified by the annuity contract by the greater of (1) the actual annuity investment value or (2) the current MCAV. The annual fee, or other fees, may further be based on the investment allocation, as specified by the annuity contract. If the investor changes his/her investment allocation during a fee period and the MCAV benefit charge increases as a result, an average benefit charge may be calculated that reflects the various investment allocations. If the contract is terminated for any reason during a fee period, as described above with respect to the step of terminating the MCAV benefit 130, the issuer of the annuity may deduct the fee from the proceeds at that time, adjusted for the number of calendar days coverage was in place during the fee period. Further, exercising an elective resetting of the MCAV may increase the annuity contract fees. The MCAV benefit may also be subject to a maximum benefit charge, as specified in the annuity contract.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and system 100 includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method of calculating a value of a benefit for an annuity contract using a processor, the annuity contract including a minimum contract accumulation value provision, the method comprising the steps of:

setting a waiting period value in a data store;

determining, using the processor, a baseline value, wherein the baseline value is a minimum contract accumulation value at a current time;

determining, using the processor, a current market value of annuity contract investments, wherein the current market value of annuity contract investments comprises a value of underlying investments of the annuity contract at a time the determining the current market value is performed;

determining, using the processor, a predetermined reset percentage contained in the annuity contract;

calculating, using the processor, a product of the current market value of the annuity contract investments and the predetermined reset percentage to create a reset amount, wherein the reset amount is not equal to the current market value of the annuity contract investments;

resetting, using the processor, the minimum contract accumulation value to the greater of (i) the baseline value, and (ii) the reset amount; and disbursing funds in the amount of the minimum contract accumulation value to a contract holder at the end of the waiting period.

2. The method of claim 1, wherein the step of resetting, using the processor, the minimum contract accumulation value occurs at least one of periodically and automatically.

3. The method of claim 2, further including a step of tolling, using the processor, the waiting period prior to the step of resetting the minimum contract accumulation value.

4. The method of claim 3, wherein the waiting period is reset, by the processor, by an elective resetting of the minimum contract accumulation value.

5. The method of claim 1, further comprising calculating a minimum contract accumulation value benefit fee, wherein the minimum contract accumulation value benefit fee is not affected by an automatic resetting of the minimum contract accumulation value.

6. The method of claim 5, wherein the automatic resetting further comprises resetting, using the processor, the minimum contract accumulation value to the greater of (i) the baseline value, and (ii) the reset amount, but not to exceed a cap value.

7. A computer readable medium bearing instructions for calculating a value of a benefit for an annuity contract, the contract including a minimum contract accumulation value provision, the instructions, when executed, being arranged to cause one or more processors to perform the steps of:

setting a waiting period value in a data store;

determining a baseline value, wherein the baseline value is a minimum contract accumulation value at a current time;

determining a current market value of annuity contract investments wherein the current market value of annuity contract investments comprises a value of underlying investments of the annuity contract at a time the determining the current market value is performed;

determining a predetermined reset percentage contained in the annuity contract;

calculating a product of the current market value of the annuity contract investments and the predetermined reset percentage to create a reset amount, wherein the reset amount is not equal to the current market value of the annuity contract investments;

resetting the minimum contract accumulation value to the greater of (i) the baseline value, and (ii) the reset amount; and disbursing funds in the amount of the minimum contract accumulation value to a contract holder at the end of the waiting period.

8. The computer readable medium of claim 7, wherein the step of resetting the minimum contract accumulation value occurs at an election of a beneficiary within a time-frame specified in the annuity contract.

9. The computer readable medium of claim 8, further including a step of tolling the waiting period prior to the step of resetting the minimum contract accumulation value.

10. The computer readable medium of claim 9, wherein the waiting period is reset by an elective resetting of the minimum contract accumulation value.

11. The computer readable medium of claim 9, further including a step of calculating a minimum contract accumulation value benefit fee.

12. The computer readable medium of claim 7, wherein the minimum contract accumulation value benefit fee is not affected by an automatic resetting of the minimum contract accumulation value.

13. A system comprising:

a processor;

a data store;

a memory, the memory comprising a plurality of instructions comprising instructions for providing an annuity contract with a minimum contract accumulation value;

instructions for tolling a waiting period; and instructions for determining a baseline value, wherein the baseline value is a minimum contract accumulation value at a current time;

instructions for determining a current market value of annuity contract investments wherein the current market value of annuity contract investments comprises a value of underlying investments of the annuity contract at a time the determining the current market value is performed;

instructions for determining a predetermined reset percentage contained in the annuity contract;

instructions for calculating a product of the current market value of the annuity contract investments and the predetermined reset percentage to create a reset amount, wherein the reset amount is not equal to the current market value of the annuity contract investments;

instructions for resetting the minimum contract accumulation value to the greater of (i) the baseline value, and (ii) the reset amount; and instructions for disbursing funds in the amount of the minimum contract accumulation value to a contract holder at the end of the waiting period.

14. The system of claim 13, wherein the plurality of instructions further comprise instructions for periodically providing an elective option to reset the minimum contract accumulation value.

15. The system of claim 14, wherein the plurality of instructions further comprise instructions for changing a fee schedule upon the resetting.

16. The method of claim 6, further comprising changing, using the processor, a fee schedule based upon the resetting.

17. The method of claim 1, wherein the determining, using the processor, a current market value of annuity contract investments comprises:

issuing a query to the data store, wherein the query requests the current market value of annuity contract investments;

receiving a return value from the data store;

assigning the return value to a variable contained within a dynamic memory module.

18. The method of claim 16, wherein the resetting further comprises:

storing the greater of (i) the baseline value, and (ii) the reset amount into a variable contained within a dynamic memory module;

setting the minimum contract accumulation value in the data store to the value of the variable;

committing the data store transaction.

19. The method of claim 17, wherein the current market value of annuity contract investments comprises a representation of the value of a financial instrument and wherein the resetting further comprises:

storing the greater of (i) the baseline value, and (ii) the reset amount into a variable contained within a dynamic memory module;

setting the minimum contract accumulation value in the data store to the value of the variable;

committing the data store transaction.

20. The method of claim 1, further comprising:

setting a reset percentage in an annuity contract;

receiving funds used to purchase the annuity contract;

receiving funds for an annuity contract investment; and investing the funds.

\* \* \* \* \*